United States Patent Office 2,909,038
Patented Oct. 20, 1959

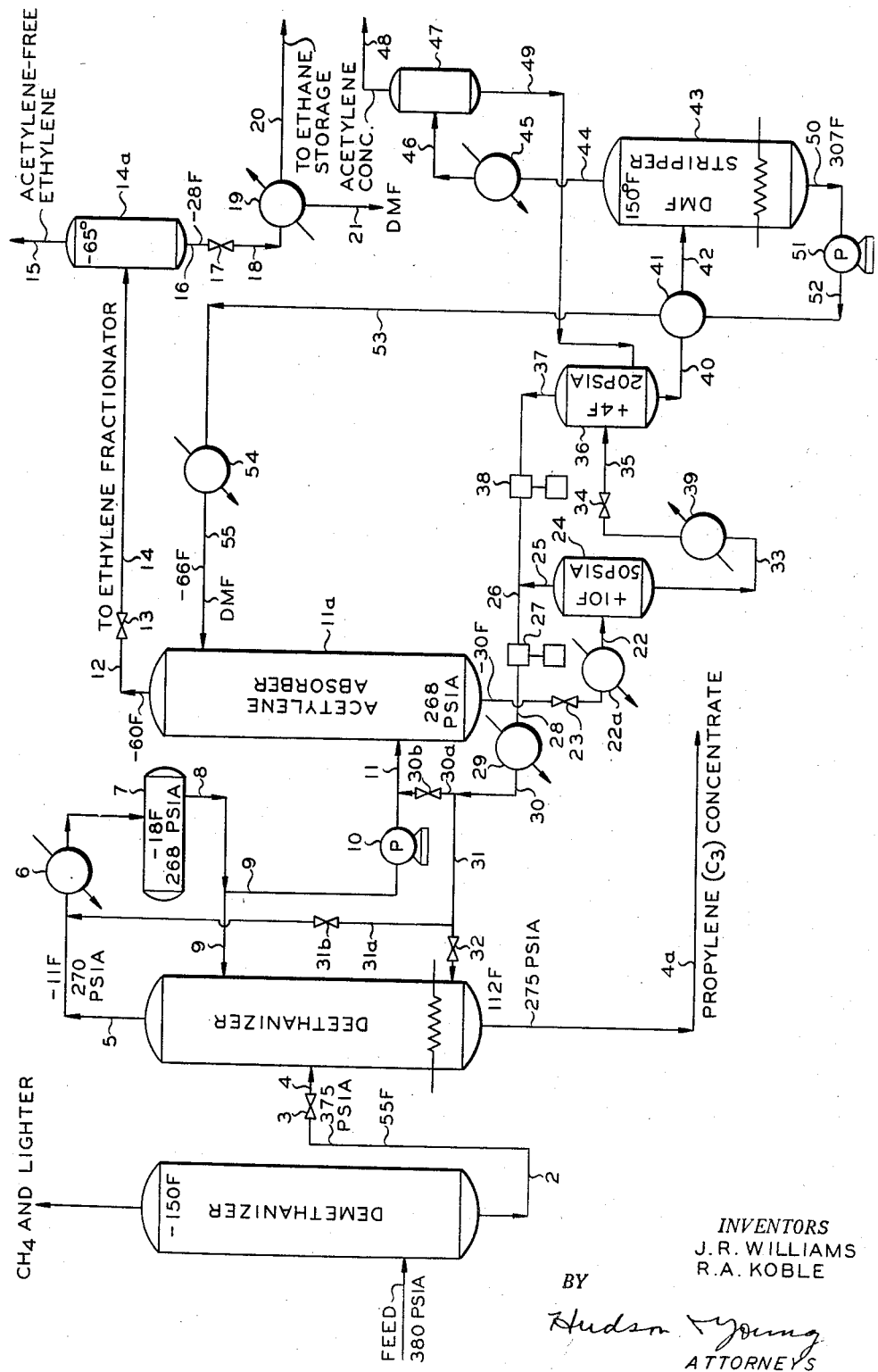

2,909,038

PURIFICATION OF GASES

Jack R. Williams and Robert A. Koble, Bartlesville, Okla., assignors to Phillips Petroleum Company, a corporation of Delaware Application December 9, 1955, Serial No. 552,178

14 Claims. (Cl. 62—17)

This invention relates to the purification of gases. In one of its aspects, the invention relates to the removal of an acetylenic hydrocarbon from a mixture containing it by a liquid-liquid contact of the said mixture (as a liquid) with a solvent selective for said acetylenic hydrocarbon. In another aspect of the invention, a liquid-liquid selective solvent removal of an acetylenic hydrocarbon is effected by contacting a normally gaseous mixture as a liquid, with a solvent selective to remove from the mixture, while it is a liquid, said acetylenic hydrocarbon. In another of its aspects, the invention relates to a liquid-liquid contact of a liquefield normally gaseous mixture containing an acetylenic hydrocarbon with a selective solvent for said acetylenic hydrocarbon to recover a solvent rich in said acetylenic hydrocarbon and other unavoidably absorbed or dissolved components of the mixture and flashing said acetylenic hydrocarbon-rich solvent to remove the said unavoidably absorbed or dissolved components and recycling the said components to a point in the system other than the place at which the liquid-liquid contact absorption is effected. In a still further aspect of the invention, it relates to a combination operation in which a gaseous mixture is liquefied and contacted as a liquid with a liquid which is selective for at least one of the gases constituting said gaseous mixture as it is contained in the liquid which is obtained when the said gases are liquefied, thus to recover, on the one hand, a purified gas, as a liquid stream, and a solvent containing dissolved or absorbed therein a gas which has been removed from the said gases to result in the said purified stream.

It is known to purify gases by contacting the same with a solvent which will selectively absorb from the gases a component or components which are undesirable therein. Furthermore, it is known to absorb an acetylenic hydrocarbon from a gaseous mixture thereof with other gases by employing various selective solvents including dimethyl formamide. Still further, it is known to take an acetylenic hydrocarbon-rich solvent and to flash the same, returning vapors thus obtained to the absorber.

We have now found that by conducting a liquid-liquid contact absorption or extraction of an acetylenic hydrocarbon from a liquefied mixture of it and other normally gaseous components, employing a selective solvent, that certain advantages result, as will be more fully set out hereinafter. Furthermore, we have found that the acetylenic hydrocarbon-rich solvent which is thus obtained can be flashed with return of the flashed gases to a point in the system which precedes the said liquid-liquid contact absorber to obtain increased economy and effectiveness of operation, also as will be described hereinafter.

It is an object of this invention to provide for an improved liquid process or method in which a mixture of gases is treated to remove at least one of the said gases from the said mixture. It is another object of this invention to provide a process for the removal of an acetylenic hydrocarbon from a mixture containing the same. It is a further object of this invention to provide a gas purification process of increased economy and effectiveness. Other aspects, objects, and the several advantages of the invention are apparent from a study of this disclosure, the drawing, and the claims which are appended to this disclosure.

According to this invention, a mixture is purified to remove undesirable gases therefrom by contacting the said mixture, as a liquid, with a solvent effective under the conditions of operation to remove from the said mixture the undesirable constituent thereof. It will be obvious to one skilled in the art in possession of this disclosure that the so-called "undesirable constituent of said mixture" need not necessarily be a constituent which is undesirable elsewhere. Thus, though the constituent is undesirable in the mixture to be purified, the said constituent may have great utility elsewhere. Since the invention applies particularly well to the removal of an acetylenic hydrocarbon from a normally gaseous mixture, it will be described in connection with such a removal. It is believed clear that alkynes, as for example acetylene and methyl acetylene, are materials which possess great utility. By "normally gaseous mixture" is meant a mixture which is in the gaseous state at atmospheric pressure and normal laboratory temperatures. By the terminology "liquefy," "liquid-liquid contact," and "contacting said mixture as a liquid in liquid-liquid contact with a solid" and other similar terminology here and in the claims is meant only that the normally gaseous mixture has been liquefied by subjecting said mixture to conditions of temperature and pressure which will liquefy the same. Liquefying a mixture of gases within the scope of this disclosure and appended claims excludes absorption of said gases, while in gaseous form, into an absorption liquid such as a mineral seal oil, thus resulting in a liquid containing said gases.

Also according to the present invention, there has been provided a combination of steps in the purification of a normally gaseous mixture by liquefying the same and contacting the same with a solvent adapted to remove undesirable constituents from said liquefied mixture which comprises additionally the flashing of the said solvent to remove certain constituents unavoidably absorbed therein and returning the said constituents to a point in the process or method which precedes the said liquid-liquid contact absorption. If the mixture is originally a liquid, there is, of course, no need to liquefy the same. Flashed gaseous constituents will, of course, be returned into the liquid mixture under conditions to become a part of said liquid mixture.

As stated, since the invention is particularly well suited to the removal or recovery of an acetylenic hydrocarbon from a normally gaseous mixture, it will now be described in more detail with reference to the drawing, in which the feed consists of a mixture of methane, ethane, acetylene, ethylene, propane and propylene.

Referring now to the drawing which illustrates a specific embodiment of this invention, generally, there are shown the following principal pieces of equipment. From left to right, the towers are respectively a demethanizer, a deethanizer, a deacetylizer or acetylene absorber, and an ethylene recovery tower. In the lower portion of the drawing, there are shown solvent flashers and a solvent stripper. As will be apparent from the detailed description which follows, various ancillary equipment is shown and described with respect to the portions of the drawing which are set forth by way of illustration only and are not intended to be complete in every of their engineering details. Thus, valves, pumps, coolers, heat exchangers and other equipment which one skilled in the art will understand to be used have been omitted for sake of simplicity.

Referring now to the drawing, a stream of gases containing ethylene and acetylene, such as produced and recovered from a cracking operation, is first demethanized by feeding the said stream of gases at a pressure of approximately 380 pounds per square inch absolute into a demethanizer operated at a top temperature of −150° F. In the demethanizer, methane and any lighter gases are substantially removed from the gases fed thereto. Bottoms from the demethanizer are passed by way of conduit 2 and pressure reducing valve 3 and further by way of conduit 4 into the deethanizer which is maintained at approximately 275 pounds per square inch absolute and which has a bottoms temperature of 112° F. In the deethanizer, $C_3$ hydrocarbons are removed and withdrawn as bottoms through conduit 4a. Overhead from the deethanizer is passed by way of conduit 5 and cooler 6 into overhead reflux drum 7. The temperature maintained in the reflux drum is about −18° F. Reflux quantities of liquid from reflux drum 7 are piped to a tray at or near the top of the deethanizer by way of conduits 8 and 9. Production quantities of material from reflux drum 7 are passed by way of conduit 9 and pump 10 and further by way of conduit 11 into the acetylene absorber 11a. This absorber operates at about 268 pounds per square inch absolute and is maintained at its bottom at approximately −30° F. and at its top at approximately −60° F. As will be understood by those skilled in the art in possession of this disclosure, it can be operated at other temperatures which can be even lower. According to the invention, as noted, this absorber is operated as a liquid-liquid contactor. That is, the absorber is substantially liquid full and the gases are also liquid under the conditions of its operation. The advantages of such operation are described elsewhere herein. The overhead from the absorber, in which dimethyl formamide (DMF) is employed to remove acetylene from the gases (which are liquid in the absorber) consists principally of ethylene and some ethane. Also some dimethyl formamide may be contained in this overhead which is removed from the absorber by way of conduit 12, expansion valve 13, and conducted by way of conduit 14 into the ethylene product recovery tower or fractionator 14a. This tower is operated in this embodiment at a tower top temperature of about −65° F. and a bottoms temperature of about −28° F. Overhead from this tower is substantially acetylene-free ethylene. This material is removed as product by way of conduit 15. Bottoms consisting essentially of ethane and some dimethyl formamide are taken from the tower by way of conduit 16, expansion valve 17, conduit 18 and cooler 19 and finally by way of conduit 20 to ethane storage, not shown. Any separate dimethyl formamide phase which collects in cooler 19 is recovered and reused. This dimethyl formamide is removed by way of conduit 21. Returning now to the liquid-liquid contact acetylene absorber, bottoms are removed by way of conduit 22 and passed by way of expansion valve 23 into flasher 24, which is operated in this embodiment at approximately +10° F. and under 50 pounds per square inch absolute pressure. The temperature in flasher 24 is adjusted by means of heat exchanger 22a in conduit 22. In flasher 24, some ethylene, acetylene and ethane are released and pumped by way of conduit 25, conduit 26, pump 27, and conduit 28, conduits 30 and 31 and valve 32 to the deethanizer column. Heat exchanger 29 may be provided in conduit 30 for removal of heat from the recycle gas stream. Some or all of the material in conduit 30 can be passed by way of conduit 30a and valve 30b into conduit 11 for return to the acetylene absorber. One of the advantages of crossover conduit 30a is found in placing the unit on stream. Further, some or all of the material in conduit 31 can be passed by way of crossover conduit 31a and valve 31b into conduit 5. Here, too, the advantages are as have just been stated among other advantages which can be recognized by one skilled in the art. Bottoms from flasher 24 are passed by way of conduit 33, expansion valve 34, and conduit 35 into a second flasher 36. Overhead from flasher 36 is taken by way of conduit 37, pump 38, into conduit 26 and by way of pump 27 and conduit 28, etc., back to the deethanizer, or elsewhere as has been described earlier. Heat exchanger 39 can be provided upon conduit 33 to adjust the temperature of the bottoms from flasher 24 before these are expanded into flasher 36. Bottoms from flasher 36 are passed by way of conduit 40, heat exchanger 41, and conduit 42 into dimethyl formamide stripper 43. In this stripper, acetylene is removed overhead by way of conduit 44, heat exchanger 45 and conduit 46 to drum 47. In drum 47, acetylene is removed and sent to storage by way of conduit 48. The storage is not shown for sake of simplicity. Bottoms from drum 47, which consist essentially of dimethyl formamide, are cycled by way of conduit 49 to flasher 36. Bottoms from the dimethyl formamide stripper are removed by way of conduit 50 and passed by way of pump 51, conduit 52, heat exchanger 41, conduit 53, cooler or chiller 54 and conduit 55 into the acetylene absorber 11a.

It will be noted that the advantages of the modus operandi of this invention, especially as applied to the purification of ethylene, in the specific embodiment noted, are various. Thus, in view of the liquid-liquid contactor absorber or extractor operation, very small relative volumes of material to be treated are necessary to be pumped and otherwise handled. Acetylene is recovered as a usable product. The ethylene product is obtained free of acetylene and therefore the ethylene, which can be used for refrigeration in the process or elsewhere, is more desirable, especially from a safety viewpoint. It will be noted also that a liquid feed is passed to the ethylene recovery tower. Such a liquid feed has many advantages over the feeding of gas to such a column, as will be understood by those skilled in the art in possession of this disclosure.

Generally, it will be clear to one skilled in the art in possession of this disclosure that the temperature may be different depending upon the solvent employed. Also, the pressure will depend upon the temperature employed. Still further, the pressure will be that which is necessary for maintaining substantially in the liquid phase the hydrocarbon which is present in those parts of the system in which a liquid hydrocarbon phase is required according to the invention.

It will be noted that the vapors which are taken off from flashers 24 and 36 are returned to the deethanizer and ordinarily not to the liquid-liquid contact absorber in which acetylene is absorbed from the ethylene-containing stream employing a liquid dimethyl formamide. This is also an important characteristic or feature of the present invention which provides for return of the said vapors from the said flashers to a point in the process or system which precedes the said liquid-liquid contact. Heat exchanger 29 is provided in conduit 30 to remove the heat in the recycle gas stream, since the introduction of this stream directly into conduit 11 would lead to undesirable heating effects in the acetylene absorber. However, it is apparent that if the recycle gas in conduit 28 is to be returned to the system through either conduits 31 or 31a, the heat of the stream will be removed in cooler 6. In this case, an advantageous saving in equipment can be realized by the elimination of heat exchanger 29.

The following material balance will aid in a more complete understanding of the embodiment of the invention which has been described by reference to the drawing.

*Material balance (mols)*

| Stream Number | 2 | 4a | 11 | 12 | 22 | 28 | 42 | 52 |
|---|---|---|---|---|---|---|---|---|
| Acetylene | 0.6 | | 2.0 | | 2.0 | 1.4 | 0.6 | |
| Ethylene | 38.0 | 0.1 | 55.9 | 37.6 | 18.3 | 18.0 | 0.3 | |
| Ethane | 9.7 | 0.3 | 9.6 | 9.4 | 0.2 | 0.2 | | |
| Propylene | 50.0 | 50.0 | | | | | | |
| Propane | 1.7 | 1.7 | | | | | | |
| DMF | | | | | 20.2 | | 20.2 | 20.2 |
| | 100.0 | 52.1 | 67.5 | 47.0 | 40.7 | 19.6 | 21.1 | 20.2 |

It can be shown with calculations based upon the Material Balance that the modus operandi of the invention possesses certain advantages including those which have been mentioned herein.

The composition of the bottoms stream coming from the demethanizer can vary, of course, and it is obvious that any ethylene-containing stream also containing acetylene, can be worked up according to the invention. Usually a stream coming from the demethanizer will have the following approximate compositions:

| | Percent |
|---|---|
| Methane | Trace to 2 |
| Acetylene | 0.4 to 1.5 |
| Ethylene | 35 to 40 |
| Ethane | 5 to 15 |
| Propylene | 40 to 60 |
| Propane | 1 to 2 |

It will be obvious to those skilled in this art that the liquid-liquid contact or extraction step in which acetylene is separated from the other constituents of the liquefied gases can be effected under widely varying conditions which give liquid phase separation. Thus, if refrigeration is available at a temperture lower than −60° F., say, at −66° F. or lower, the extractor can obviously be operated at lower pressures than those which would correspond to the temperatures just mentioned. The temperature is obviously limited only by the freezing point of the solvent used.

With reference to maximum utilization of solvent, the vapor stream in conduit 30, during separation, in one embodiment, is returned to the acetylene absorber by way of conduit 11. It will be noted that even in this event the vapors are not directly returned to the said absorber.

Further, according to the presently disclosed modus operandi, the product ethylene is not contaminated with DMF or other solvent because said solvent is removed at the foot of the ethylene fractionator.

Finally, another important advantage of the overall system is that the ethylene once liquefied for the liquid-liquid contact of the invention is used directly as a liquid as a feed to the ethylene fractionator and, therefore, low temperature reflux requirements are reduced. With a vapor feed, it is apparent that the liquefaction within the fractionator would be at the expense of additional low temperature refrigeration required by the column reflux condenser.

Although the invention has been described in a specific embodiment with relation to the removal of acetylene from a mixture containing it, ethylene and other gases by liquid-liquid contact with dimethyl formamide, it is obviously not limited thereto. For example, it is obvious that other solvents selective for acetylenic hydrocarbons can be used, such as dimethyl sulfoxide, acetone, acetic anhydride, and dialkyl amides in addition to dimethyl formamide such as diethyl acetamide, diethyl formamide, and the like. Further, other systems comprising different acetylenic hydrocarbons can be processed by this invention. For example, methyle acetylene can be removed from a mixture of it, propylene, and other gases with a suitable solvent, for example, dimethyl formamide. Also, ethyl acetylene and/or vinyl acetylene can be removed from a mixture comprising butylenes and/or butadiene. Diacetylene can be removed from a normally gaseous mixture by the process of this invention. In addition, the liquid mixture comprising the acetylenic hydrocarbon need not be from a prior fractionation step as shown in the drawing of a specific embodiment but can be used directly as a liquid, for example, from a reaction zone in which a chemical reaction involving an acetylenic hydrocarbon is carried out in liquid phase. Additional selective solvents, systems, and applications of this invention will be apparent to one skilled in the art in possession of this disclosure.

It is evident from the foregoing description that the invention is applicable generally to the separation of light hydrocarbons, for example, acetylenic hydrocarbons from other light hydrocarbons, particularly from mixtures containing olefins, which mixtures can also contain paraffins.

The acetylenic hydrocarbon need not boil close to the desired pure gas. For example, diacetylene might be the impurity to be removed from a mixture of lower boiling hydrocarbons. Since it is heat sensitive, distillation may not always be desirable. The diacetylene can readily be removed according to the invention.

Reasonable variation and modification are possible within the scope of the foregoing disclosure, drawing, and the appended claims to the invention, the essence of which is that a mixture, ordinarily a normally gaseous mixture, is purified to remove the contaminant or other gases therefrom by contacting the said mixture in liquid phase with a solvent adapted to remove said contaminant or other gas therefrom under the conditions of operation and further characterized in that the contaminant-rich solvent is flashed to remove unavoidably dissolved gaseous constituents therefrom and then the said unavoidably dissolved removed now gaseous constituents are recycled to a point in the system which precedes the said liquid-liquid contact. The now greatest advantages and the presently preferred operation is that in which a normally gaseous mixture is treated, as described.

We claim:

1. The removal of a gas from a mixture of gases which are normally gaseous which comprises liquefying said mixture by subjecting said mixture to conditions of temperature and pressure which will liquefy the same and contacting the said mixture of gases as a liquid with a solvent adapted under the conditions of liquid-liquid contact to remove from said mixture a liquefied component recovering on the one hand a stream from which said component has been removed and on the other hand a solvent rich in said removed component, flashing said solvent rich in said removed component to remove therefrom portions of said mixture, other than said component gas, which have been unavoidably absorbed during the liquid-liquid contact, to remove from said solvent the said unavoidably absorbed portions and returning said unavoidably absorbed now recovered portions to a point in the system which precedes the said liquid-liquid contact.

2. A method according to claim 1 wherein the component gas is an acetylenic hydrocarbon.

3. A method according to claim 1 wherein the gas mixture to be treated is composed essentially of ethylene and acetylene.

4. The removal of a normally gaseous acetylenic hydrocarbon component from a normally gaseous mixture which comprises subjecting said mixture to conditions of temperature and pressure which will liquefy the same and then contacting said mixture as a liquid in a liquid-liquid contact with a solvent selective for said acetylenic hydrocarbon so as to solvent extract a substantial proportion of said hydrocarbon component from said mixture while said mixture is maintained under conditions of temperature and pressure which will maintain said mixture as a liquid in the presence of said solvent.

5. A method for the recovery of substantially pure ethylene and substantially pure acetylene from a mixture of gases containing the same together with other gases which comprises feeding said gases to a zone wherein some gases other than acetylene are removed from said gases, then contacting the remainder of said gases under conditions of temperature and pressure which will liquefy the same and maintain the same in liquid form with an absorbing medium also in liquid form to recover therefrom substantially only acetylene dissolved in said absorbing medium, recovering acetylene from said absorbing medium, recovering from said contacting a fraction containing essentially ethane and ethylene but not containing acetylene in appreciable quantity, separating the ethane from the ethylene and recovering ethylene substantially free from ethane.

6. A method according to claim 5 wherein the absorbing medium is dimethyl formamide.

7. The removal of acetylene and ethylene from a mixture of hydrocarbons containing the same together with other hydrocarbons which comprises demethanizing said mixture when it contains methane, removing $C_3$ hydrocarbons from said mixture when such hydrocarbons are contained therein, passing the remainder of said gases under conditions of temperature and pressure which will liquefy the same and maintain the same as a liquid into a liquid-liquid contact with a solvent selective to remove acetylene therefrom, obtaining from said liquid-liquid contact an overhead stream rich in ethylene and a lower stream of solvent containing acetylene and some unavoidably extracted ethylene, flashing said lower stream to recover therefrom at least a portion of said ethylene, and returning said ethylene to the system ahead of said liquid-liquid contact.

8. The operation of claim 7 wherein the flashed solvent containing acetylene is stripped to recover acetylene and the solvent is recycled to the liquid-liquid contact step.

9. A method for the recovery of substantially pure ethylene and substantially pure acetylene from a mixture of gases containing the same which comprises concentrating into a liquid form a substantial proportion of the ethylene and acetylene present in said gases by subjecting said gases to conditions of temperature and pressure which will liquefy the same thus obtaining a liquid, contacting said liquid with a liquid-absorbing medium so as to recover in said medium largely acetylene only dissolved in said medium, recovering from said contacting a fraction containing essentially ethylene and not containing acetylene in appreciable quantity, separating the ethylene from said fraction and recovering the same substantially free from acetylene and other gases which originally accompanied it in said mixture.

10. A method for the recovery of substantially pure ethylene and substantially pure acetylene from a mixture of gases containing the same which comprises concentrating into a liquid form a substantial proportion of the ethylene and acetylene present in said gases by subjecting said gases to conditions of temperature and pressure which will liquefy the same thus obtaining a liquid, contacting said liquid with a liquid-absorbing medium so as to recover in said medium largely acetylene only dissolved in said medium, recovering from said contacting a fraction containing essentially ethylene and not containing acetylene in appreciable quantity, separating the ethylene from said fraction, recovering the same substantially free from acetylene and other gases originally accompanying it in said mixture, recovering from said liquid-absorbing medium a stream containing acetylene and some ethylene, and returning at least a fraction of said stream containing acetylene and some ethylene to a point in the system which precedes the contacting of the gases in liquid form with said medium.

11. A method according to claim 10 wherein the absorbing medium is dimethyl formamide.

12. A method for the recovery of substantially pure ethylene and substantially pure acetylene from a mixture of gases containing the same together with other gases which comprises feeding said gases to a zone wherein some gases other than acetylene are removed from said gases, then contacting the remainder of said gases under conditions of temperature and pressure which will maintain said gases in liquid form with an absorbing medium also in liquid form to recover therefrom substantially only acetylene dissolved in the absorbing medium, recovering a stream of acetylene containing ethylene from said absorbing medium, recovering from said contacting a fraction containing essentially ethane and ethylene but not containing acetylene in appreciable quantity, separating the ethane from the ethylene, recovering the ethylene substantially free from ethane, and returning said stream of acetylene-containing ethylene to a point in the system which precedes the contact of the gases in liquid form with said absorbing medium.

13. A method according to claim 12 wherein the absorbing medium is dimethyl formamide.

14. The removal of acetylene and ethylene from a mixture of hydrocarbons containing the same together with other hydrocarbons which comprises demethanizing said mixture when it contains methane, removing $C_3$ hydrocarbons from said mixture when such hydrocarbons are contained therein, passing the remainder of said gases under conditions of temperature and pressure which will maintain said gases as a liquid into a liquid-liquid contact with a solvent selective to remove acetylene therefrom, obtaining from said liquid-liquid contact an overhead stream rich in ethylene and a lower stream of solvent containing acetylene and some unavoidably extracted ethylene, flashing said lower stream to recover therefrom at least a portion of said ethylene, and returning said ethylene to the system at the place at which $C_3$ hydrocarbons are removed from said mixture when such hydrocarbons are contained therein.

References Cited in the file of this patent

UNITED STATES PATENTS

| 1,465,600 | Eldred | Aug. 21, 1923 |
| 2,029,120 | Schilling | Jan. 28, 1936 |
| 2,038,314 | Ragatz | Apr. 21, 1936 |
| 2,111,360 | Cutting | Mar. 15, 1938 |
| 2,236,963 | Babcock | Apr. 1, 1941 |
| 2,236,964 | Babcock | Apr. 1, 1941 |
| 2,236,965 | Babcock | Apr. 1, 1941 |
| 2,236,966 | Balthis | Apr. 1, 1941 |
| 2,236,978 | Taylor | Apr. 1, 1941 |
| 2,250,925 | Babcock | July 29, 1941 |
| 2,355,167 | Keith | Aug. 8, 1944 |
| 2,374,104 | Kirkbride | Apr. 17, 1945 |
| 2,383,551 | Isham | Aug. 28, 1945 |
| 2,384,378 | Kooker | Sept. 4, 1945 |
| 2,395,362 | Welling | Feb. 19, 1946 |
| 2,504,429 | Latchum | Apr. 18, 1950 |
| 2,542,520 | Hibshman | Feb. 20, 1951 |
| 2,573,341 | Kniel | Oct. 30, 1951 |
| 2,582,443 | Linn | Jan. 15, 1952 |
| 2,600,133 | Simms | June 10, 1952 |
| 2,630,403 | Miller | Mar. 3, 1953 |
| 2,689,625 | Davis | Sept. 21, 1954 |
| 2,726,734 | Nirenberg | Dec. 13, 1955 |
| 2,745,889 | Johnston | May 15, 1956 |